(12) United States Patent
Argillier et al.

(10) Patent No.: US 6,706,397 B2
(45) Date of Patent: Mar. 16, 2004

(54) PROCESS FOR MANUFACTURING MICROCAPSULES BY INTERFACIAL POLYCONDENSATION WITH POLYOXYALKYLENEAMINE AND ACID CHLORIDES

(75) Inventors: Jean-François Argillier, Saint Cloud (FR); Maria-Lidice Soto-Portas, Lyons (FR); Nathalie Zydowicz, Saint Priest (FR); Françoise Mechin, Lyons (FR); Angèle Chomard, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 92 days.

(21) Appl. No.: 10/128,280

(22) Filed: Apr. 24, 2002

(65) Prior Publication Data

US 2002/0158356 A1 Oct. 31, 2002

(30) Foreign Application Priority Data

Apr. 27, 2001 (FR) .............................. 01 05674

(51) Int. Cl.$^7$ ............................ B32B 15/02; B01J 13/02
(52) U.S. Cl. ................. 428/402.21; 264/4.1; 264/4.33; 264/4.7; 524/801; 524/803
(58) Field of Search ................. 264/4.1, 4.33, 264/4.7; 428/402.21; 524/801, 803

(56) References Cited

U.S. PATENT DOCUMENTS 3,981,821 A 9/1976 Kiritani et al.
5,456,916 A 10/1995 Kurata et al.

FOREIGN PATENT DOCUMENTS

GB 1142649 12/1969
GB 1416224 3/1975

Primary Examiner—Samuel A. Acquah
(74) Attorney, Agent, or Firm—Antonelli, Terry, Stout & Kraus, LLP

(57) ABSTRACT

The present invention relates to a process of obtaining microcapsules, comprising mainly the following stages:

preparing a scarcely water-soluble organic phase containing a determined amount of acid chlorides, forming an emulsion of said organic phase in an aqueous phase, adding to the aqueous emulsion an amount of at least one polyoxyalkylene polyamine, reacting the monomers containing the amine and acid chloride functions so as to form a polyamide membrane around the emulsified organic phase, recovering the microcapsules obtained.

The present invention also relates to a microcapsule.

23 Claims, No Drawings

PROCESS FOR MANUFACTURING MICROCAPSULES BY INTERFACIAL POLYCONDENSATION WITH POLYOXYALKYLENEAMINE AND ACID CHLORIDES

FIELD OF THE INVENTION

The present invention relates to a process intended for encapsulation of weakly polar organic products by interfacial polycondensation.

Interfacial polycondensation is a technique allowing in-situ manufacture of a polymer membrane at the surface of the droplets of an emulsion. This membrane is obtained by chemical reaction between two types of monomer so selected that the polymerization reaction takes place at the interface between the disperse phase and the continuous phase.

BACKGROUND OF THE INVENTION

Encapsulation by interfacial polycondensation is a well-known technique (Microencapsulation: Methods and Industrial Applications, Edited by S. Benita, Marcel Dekker 1996) which generally involves two types of complementary monomers, one being soluble in the aqueous phase and the other in the organic phase. Examples of industrial applications of this technique are essentially known in the phytosanitary sphere (document FR-2,419,676 for example) for the production of insecticide, herbicide and fungicide microcapsules with polyamide, polyurea or polyurethane membranes, and in the biomedical and veterinary sphere.

DESCRIPTION OF THE INVENTION

The present invention relates in particular to the polycondensation of direct oil/water emulsions at the surface of droplets and to the formation of microcapsules whose core consists of a weakly polar organic product embedded in a polyamide membrane. The material to be encapsulated is either directly the weakly polar organic product, or another material or additive which is solubilized or dispersed in the weakly polar organic product.

The present invention thus relates to a process of obtaining microcapsules, comprising mainly the following stages:

preparing a scarcely water-soluble organic phase containing a determined amount of acid chlorides, forming an emulsion of said organic phase in an aqueous phase, adding to the aqueous emulsion an amount of at least one polyoxyalkylene polyamine, reacting the monomers containing the amine and acid chloride functions so as to form a polyamide membrane around the emulsified organic phase, recovering the microcapsules obtained.

The aqueous phase can contain a surface-active additive.

The additive can be a polymer having a surface-active function, for example partly hydrolysed polyvinylalcohol PVA.

The molar ratio R of the amine functions to the chloride functions can range between 1 and 30, preferably between 4 and 10.

The polyamine can be a diamine of general formula:

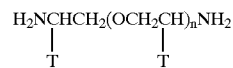

with T methyl ($CH_3$) or hydrogen (H), and n ranging between 2 and 40, preferably between 2 and 8.

In a variant, n is about 2.6.

In another variant, the polyamine can be a triamine of general formula:

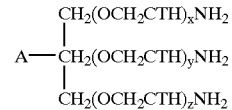

A is an alkyl group containing 1 to 20 carbon atoms, A preferably is an ethyl group, T is methyl ($CH_3$) or hydrogen (H), x, y and z each range independently between 1 and 8.

The number of amine functions can furthermore be provided by adding diethylenetriamine.

Said acid chlorides can be selected from among sebacoyl chloride, trimesoyl chloride or mixtures thereof.

A mixture of sebacoyl and trimesoyl acid chloride can be respectively 90% and 10% in COCl functions.

The amount of acid chloride can range between 0.3 and 4 moles of COCl per milliliter of organic phase, preferably between 1 and 2 moles per milliliter.

The invention also relates to a microcapsule containing a scarcely water-soluble organic phase embedded in a polyamide membrane resulting from the reaction between at least one polyoxyalkylene polyamine and acid chlorides. According to the invention, the polyamine comprises at least one of the following amines:

a diamine of general formula:

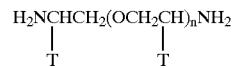

with T methyl ($CH_3$) or hydrogen (H), and n ranging between 2 and 40, preferably between 2 and 8, and in particular n is about 2.6;

a triamine of general formula:

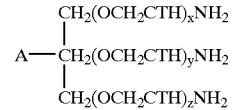

A is an alkyl group containing 1 to 20 carbon atoms, preferably A is an ethyl group, T is methyl ($CH_3$) or hydrogen (H), x, y and z each independently range between 1 and 8.

The acid chloride functions can be provided by sebacoyl chloride, trimesoyl chloride or mixtures thereof.

The amine functions can be provided by adding other polyamines, notably diethylenetriamine.

One of the main advantages of the process according to the invention is that it allows to control the thickness, the mechanical properties and the salting out properties of the polyamide microcapsule, on the one hand by controlling hydrolysis of the acid chloride by its initial concentration, the stirring time and the reaction time, and on the other by adding trifunctional monomers.

One of the applications of these capsules can be thermal insulation by using, as the organic phase, a rather insulating material, for example light-cut or other petroleum products, vegetable oils, glycol chemical derivatives, etc., convection being blocked by the encapsulated structure. Phase-change materials can be advantageously used, consisting for example of a mixture of chemical compounds from the alkanes family: paraffins, waxes, fatty alcohols, fatty acids, etc.

The acid chlorides (COCl) used can be selected, for example, from the following list:
adipoyl chloride
sebacoyl chloride
succinyl chloride
(meta, para) phthaloyl chloride
4,4-sulphonyldibenzoyl chloride
1,6-hexanedisulphonyl chloride
1,4-cyclohexanedicarbonyl chloride
1,2-ethanedisulphonyl chloride
4,4-biphenyldicarbonyl chloride
phosgene
dimethoxycarbonylterephthaloyl chloride
1,3,5-benzenetricarbonyl trichloride, or trimesoyl chloride.

Sebacoyl chloride and/or trimesoyl chloride, or mixtures thereof, are preferably used.

The polyoxyalkyleneamine used within the scope of the invention is a polyamine, preferably a di or triamine, sufficiently soluble in water, which can be defined by:

In the case of a diamine:

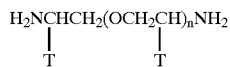

where T can be methyl ($CH_3$) or hydrogen (H), and n ranges between 2 and 40, preferably between 2 and 8.

Among these compounds, Jeffamine D-230 is the compound having for n a mean value of 2.6.

In the case of a triamine:

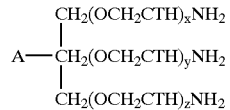

with:
A an alkyl group containing 1 to 20 carbon atoms, A preferably is an ethyl group,
T is methyl ($CH_3$) or hydrogen (H),
X, y and z each independently range between 1 and 8.

Among these compounds, Jeffamine T-403 (HUNTSMAN Int.): A ethyl, T methyl and x+y+z=5.3.

The other amines used in combination with the polyoxyalkylene polyamine can be:
ethylenediamine
hexamethylenediamine
piperazine
1,3-propylenediamine
tetramethylenediamine
p-phenylenediamine
bis(4-aminocyclohexyl)methane
1,4-bis(aminomethyl)cyclohexane
bis(p-aminophenyl)methane
1-lysine
4,4'-oxydianiline
4,4'-methylenedianiline
biopolymers, proteins, polysaccharides
diethylenetriamine
triethylenetetramine
tetraethylenepentamine.

The organic phase can be any weakly polar and scarcely water-soluble liquid (at working temperature). In an example according to the invention, the organic phase is a phase-change material, for example a paraffin or a mixture of paraffins. In this case, the working temperature must be higher than the melting temperature of the paraffin so as to be able to form a liquid/liquid emulsion for implementing the process.

The products used in the examples are (the identification names used afterwards are given in brackets):
Amines: Jeffamine D-230 (JA):
Code and name of the product 75 851 Jeffamine D-230
Supplier: HUNTSMAN Int. Trading Corp., Chemical name and/or family or description: Polyalkylamine, No. CAS: [9046-10-0], Aspect: transparent liquid.
Diethylenetriamine (DETA)
Supplier: ALDRICH, No. CAS [111-40-0], liquid.
Acid chlorides:
Sebacoyl chloride (CS)
Supplier: ALDRICH, No. CAS [111-19-3], liquid.
1,3,5-benzenetricarbonyl trichloride or trimesoyl chloride (TMC)
Supplier: ALDRICH, No. CAS [4422-95-1], solid.
Demineralized water
Paraffin LINPAR 18-20 marketed by CONDEA Augusta S.p.A.
Surfactant: Polyvinylalcohol (PVA)
Hydrolysed at 88%, Mw=22000 g/mol, supplier: JANSSEN CHIMICA—No. CAS [9002-89-5].

The protocol allowing the microcapsules to be obtained can be as follows:
a) Preparation of the Aqueous Solution of the Surfactant:
Dissolution at 60° C. of the surfactant (PVA) at 1% by weight in 150 ml demineralized water.
b) Emulsification Stage:
In a double-walled reactor (circulating water at 28° C.), the PVA solution is added to the 150 ml. Stirring is set at 600 rpm (6 PTFE blades), and 30 ml of the organic phase (paraffin Linpar 18-20) and the acid chloride(s) (CS or TMC or CS+TMC) are added dropwise. The emulsification time is 5, 15 or 60 minutes.
c) Polycondensation Reaction Stage Formation of the Capsules:
After the emulsion has formed, the stirring speed is set at 300 rpm. 150 ml of an aqueous solution of amines (JA or JA+DETA) is added dropwise (for about 10 minutes). The reaction progresses for 15 or 60 minutes according to the examples.

The total volume of emulsion is 330 ml, the PVA concentration is 0.5% in relation to water.

The respective amounts of amines and acid chloride are defined by a ratio R equal to the molar ratio of the amine functions to the acid chloride functions provided by the various constituents. R ranges between 1 and 30, preferably between 4 and 10, and in the following examples it is about 5, except in the presence of an inorganic base Na2CO3 where R is about 1. In the absence of an inorganic base, an amine function excess allows to neutralize at least partly the acidity formed during the polycondensation reaction.

When trifunctional compounds are used, the NH2 functions of JA and DETA are substantially distributed equitably.

When a mixture of TMC and CS is used, the proportion of the COCl functions is substantially 10% and 90% respectively.

In the following examples, 6, 20, 30, 60 or 100 millimoles of COCl are used in the 30 ml of paraffin type organic base.

d) Recovery of the Capsules:

At the end of the reaction, the capsules are recovered by discharging the aqueous phase. The separation is simplified by the density difference between the two phases, which allows creaming of the microcapsules to be observed. The capsules are washed three times with warm water, then three times with cyclohexane under vacuum filtration.

e) Drying of the Capsules:

Once recovered by filtration, the capsules are either freeze dried or dried at ambient temperature.

The encapsulation yield is estimated as follows: 30 ml cyclohexane is added to 50 ml of reaction mixture (aqueous solution+microcapsules). After magnetic stirring, the mixture is centrifuged for 10 minutes at 3000 rpm. The cyclohexane-paraffin mixture is recovered with a teat pipette, then the cyclohexane is evaporated under rotavap. The non-encapsulated paraffin recovered at the bottom of the drum is weighed. The yield is 100 times the ratio of the mass of paraffin recovered to the mass of initial paraffin.

RESULTS

The following non limitative examples allow to illustrate the process according to the present invention. In each example, the type of monomer used and the reaction conditions are reminded.

Formulation (a)

Amines: JA+DETA
Acid chloride: CS
$20.10^{-3}$ mole of COCl
R=5
Emulsification time=15 minutes
Reaction time=15 minutes.

An 8% encapsulation yield is obtained under such conditions. As observed by optical microscopy and scanning electron microscopy, the capsules are spherical. The grain size of the microcapsules is characterized by $\varnothing_{0.5}=107$ μm. The low yield is probably due to a hydrolysis of a large part of the initial acid chloride during the reaction.

Formulation (b)

Amines: JA+DETA
Acid chloride: CS
$60.10^{-3}$ mole of COCl
R=5
Emulsification time=15 minutes
Reaction time=15 minutes.

A 60% encapsulation yield is obtained under such conditions. As observed by optical microscopy and scanning electron microscopy, the capsules are spherical. The grain size of the microcapsules is characterized by $\varnothing_{0.5}=97$ μm. The increase in the acid chloride concentration has allowed to increase the encapsulation yield.

Formulation (c)

Amines: JA+DETA
Acid chloride: CS
$60.10^{-3}$ mole of COCl
R=5
Emulsification time=5 minutes
Reaction time=15 minutes
Encapsulation yield=90%.

The emulsification time decrease allows to limit the hydrolysis of the acid chloride and consequently to increase the reaction yield. It can be noted that, as observed by optical microscopy and scanning electron microscopy, the capsules are spherical. The grain size of the microcapsules is characterized by $\varnothing_{0.5}=167$ μm. A poor elasticity of the membrane can be observed by optical microscopy during the heating/cooling cycle. It can also be noted that, upon recovery of the capsules by freeze drying, a <<cake>> aspect (aggregates) is obtained, as well as after drying at ambient temperature.

Formulation (d)

Amines: JA+DETA
Acid chloride: CS
$100.10^{-3}$ mole of COCl
R=5
Emulsification time=5 minutes
Reaction time=15 minutes.

A 70% encapsulation yield is obtained under such conditions. The grain size of the microcapsules is characterized by $\varnothing_{0.5}=104$ μm. Too high an increase in the acid chloride concentration is not favourable (see the results of formulation b). It can also be noted that, upon recovery of the capsules by freeze drying, a <<paste>> aspect is obtained.

Formulation (e)

Amines: JA+DETA
Acid chloride: CS
$60.10^{-3}$ mole of COCl
R=1
Inorganic base
Emulsification time=5 minutes
Reaction time=15 minutes.

An inorganic base is used in this formulation to neutralize the acidity released during the synthesis reaction. An 80% encapsulation yield is obtained under such conditions. As observed by optical microscopy and scanning electron microscopy, the capsules are spherical. The grain size of the microcapsules is characterized by $\varnothing_{0.5}=152$ μm. It can also be noted that, upon recovery of the capsules by drying at ambient temperature, a <<glue>> aspect is obtained.

Formulation (f)

Amines: JA
Acid chloride: TMC
$30.10^{-3}$ mole of COCl
R=5
Emulsification time=5 minutes
Reaction time=15 minutes.

Trimesoyl chloride is used as the acid chloride and only Jeffamine is used as the amine in this formulation. A 90% encapsulation yield is obtained under such conditions. As observed by optical microscopy and scanning electron microscopy, the capsules are rather non-spherical. The grain size of the microcapsules is characterized by $\varnothing_{0.5}=202$ μm. It can also be noted that, upon recovery of the capsules by drying at ambient temperature, an <<aggregate>> aspect is obtained; on the other hand, a powder is obtained by freeze drying. Introduction of a trifunctional monomer (TMC) allows a cross-linked polymer to be obtained.

Formulation (g)

Amines: JA
Acid chloride: TMC
$6.10^{-3}$ mole of COCl
R=5
Emulsification time=5 minutes
Reaction time=15 minutes.

In this formulation, the acid chloride concentration has been decreased because of the low solubility of the TMC in the organic phase. An 80% encapsulation yield is obtained under such conditions. A certain acid concentration is therefore necessary. The grain size of the microcapsules is characterized by $\varnothing_{0.5}=138$ μm. It can also be noted that, upon recovery of the capsules by drying at ambient temperature, an <<aggregate>> aspect is observed, as well as by freeze drying.

Formulation (h)

Amines: JA
Acid chloride: CS-TMC
$30.10^{-3}$ mole of COCl
R=5
Emulsification time=5 minutes
Reaction time=15 minutes.

A mixture of acid chlorides is used and only Jeffamine is used as the amine in this formulation. A 90% encapsulation yield is obtained under such conditions. As observed by optical microscopy and scanning electron microscopy, the capsules are spherical. The grain size of the microcapsules is characterized by $\varnothing_{0.5}=96$ μm. It can also be noted that, upon recovery of the capsules by freeze drying, an <<aggregate>> aspect is observed.

Formulation (i)

Amines: JA
Acid chloride: CS+TMC
$30.10^{-3}$ mole of COCl
R=5
Emulsification time=5 minutes
Reaction time=60 minutes.

The reaction time is increased to 60 minutes. A 90% encapsulation yield is obtained under such conditions. As observed by optical microscopy and scanning electron microscopy, the capsules are spherical. The grain size of the microcapsules is characterized by $\varnothing_{0.5}=127$ μm. It can also be noted that, upon recovery of the capsules by drying at ambient temperature, an <<aggregate>> aspect is observed. A very good elasticity of the membrane is also observed by optical microscopy during the heating/cooling cycle.

Formulation (j)

Amines: JA+DETA
Acid chloride: CS+TMC
$30.10^{-3}$ mole of COCl
R=5
Emulsification time=5 minutes
Reaction time=15 minutes.

A mixture of acid chlorides and a mixture of amines, including Jeffamine, are used in this formulation. A 90% encapsulation yield is obtained under such conditions. As observed by optical microscopy and scanning electron microscopy, the capsules are spherical. The grain size of the microcapsules is characterized by $\varnothing_{0.5}=163$ μm. It can also be noted that, upon recovery of the capsules by freeze drying, a powder aspect is observed, whereas an <<aggregate>> aspect is obtained by drying at ambient temperature. The thickness of the membrane determined by SEM is of the order of 650 nm. These results are very interesting. The introduction of the two trifunctional monomers (TMC and DETA) allows a cross-linked polymer to be obtained.

Formulation (k)

Amines: JA+DETA
Acid chloride: CS+TMC
$30.10^{-3}$ mole of COCl
R=5
Emulsification time=5 minutes
Reaction time=60 minutes.

A mixture of acid chlorides and of amines is used in this formulation, with a 60-minute reaction time. A 90% encapsulation yield is obtained under such conditions. As observed by optical microscopy and scanning electron microscopy, the capsules are spherical. The grain size of the microcapsules is characterized by $\varnothing_{0.5}=249$ μm. It can also be noted that, upon recovery of the capsules by freeze drying, a powder is observed, whereas an <<aggregate>> aspect is obtained by drying at ambient temperature. These results are very interesting.

What is claimed is:

1. A process of obtaining microcapsules, comprising the following steps:
    a) preparing a scarcely water-soluble organic phase containing a determined amount of at least one acid chloride,
    b) forming an emulsion of said organic phase in an aqueous phase,
    c) adding to the aqueous emulsion an amount of at least one polyoxyalkylene polyamide,
    d) reacting the polyamine and acid chloride so as to form microcapsules each comprising a polyamide membrane around the emulsified organic phase,
    a) recovering the microcapsule obtained.

2. A process as claimed in claim 1, wherein said aqueous phase contains a surface-active additive.

3. A process as claimed in claim 2, wherein said additive is a polymer having a surfactant function.

4. A process as claimed in claim 1, wherein a molar ratio R of amine functions to chloride functions ranges between 1 and 30.

5. A process as claimed in claim 1, wherein said polyamine is a diamine of general formula:

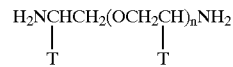

with T being methyl ($CH_3$) or hydrogen (H), and n ranging between 2 and 40.

6. A process as claimed in claim 5, wherein n is about 2.6.

7. A process as claimed in claim 1, wherein said polyamine is a triamine of general formula:

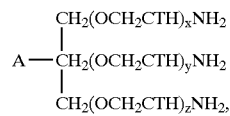

A is an alkyl group containing 1 to 20 carbon atoms,
T is methyl ($CH_3$) or hydrogen (H), and
x, y and z each range independently between 1 and 8.

8. A process as claimed in claim 1, wherein step (c) further includes adding diethylenetriamine.

9. A process as claimed in claim 1, wherein said acid chloride selected from the group consisting of sebacoyl chloride, trimesoyl chloride and mixtures thereof.

10. A process as claimed in claim 9, wherein the acid chloride a mixture of sebacoyl and trimesoyl acid chloride respectively having 90% and 10% in COCl functions.

11. A process as claimed in claim 1, wherein said amount of acid chloride ranges between 0.3 and 4 moles of COCl per milliliter of organic phase.

12. A microcapsule containing a scarcely water-soluble organic phase embedded in a polyamide membrane resulting from the reaction between at least one polyoxyalkylene polyamine and at least one acid chloride, characterized in that said polyamine comprises at least one of the following amines:

a diamine of general formula:

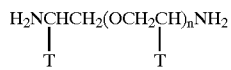

with T being methyl ($CH_3$) or hydrogen (H), and n ranging between 2 and 40;

a triamine of general formula:

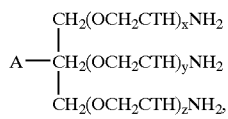

wherein

A is an alkyl group containing 1 to 20 carbon atom

T is methyl ($CH_3$) or hydrogen (H), and x, y and z each independently range between 1 and 8.

13. A microcapsule as claimed in claim 12, wherein the acid chloride is selected from the group consisting of sebacoyl chloride, trimesoyl chloride and mixtures thereof.

14. A microcapsule as claimed in claim 12, wherein the polyamide membrane results from the reaction between said at least one polyalkylene polyamide and at least one additional polyamide and said at least one acid chloride.

15. The process according to claim 3, wherein said polymer having a surfactant function is partly hydrolysed polyvinyl alcohol PVA.

16. The process according to claim 4, wherein a molar ratio R of amine functions to chloride functions is between 4 and 10.

17. The process according to claim 5, wherein n ranges between 2 and 8.

18. The process of claim 7, wherein A is an ethyl group.

19. The process of claim 11, wherein the amount of acid chloride is between 1 and 2 moles of COCl per milliliter of organic phase.

20. The microcapsule of claim 12, wherein n is between 2 and 8.

21. The microcapsule of claim 12 wherein n is 2.8.

22. The microcapsule of claim 12, wherein A is an ethyl group.

23. The microcapsule of claim 14, wherein the additional polyamide is diethylenetriamine.

* * * * *